United States Patent [19]
Park

[11] Patent Number: 5,881,690
[45] Date of Patent: Mar. 16, 1999

[54] SYSTEM FOR VARIABLY CONTROLLING OPERATION OF AN INTAKE/EXHAUST VALVE FOR AN INTERNAL COMBUSTION ENGINE

[75] Inventor: Deokkyu Park, Kyungki-do, Rep. of Korea

[73] Assignee: Hyundai Motor Company, Seoul, Rep. of Korea

[21] Appl. No.: 994,779

[22] Filed: Dec. 19, 1997

[30] Foreign Application Priority Data

Dec. 20, 1996 [KR] Rep. of Korea ............... 1996-68613

[51] Int. Cl.[6] .............................. F01L 1/34; F01L 13/00
[52] U.S. Cl. .................. 123/90.18; 123/90.6; 74/568 R
[58] Field of Search ........................ 123/90.12, 90.15, 123/90.17, 90.18, 90.6; 74/568 R

[56] References Cited

U.S. PATENT DOCUMENTS

| | | | |
|---|---|---|---|
| 3,633,554 | 1/1972 | Nakajima et al. | 123/90.18 |
| 5,080,055 | 1/1992 | Komatsu et al. | 123/90.18 |
| 5,211,141 | 5/1993 | Hannibal et al. | 123/90.17 |
| 5,329,895 | 7/1994 | Nishida et al. | 123/90.18 |

*Primary Examiner*—Weilun Lo

[57] ABSTRACT

A valve control system for variably controlling operation, including the valve lift, of a valve for an internal combustion engine having a crankshaft based on a driving condition of a vehicle. The valve control system includes a camshaft assembly having a cam for operating the valve while driven by the crankshaft, the camshaft having a longitudinal axis, a hydraulic control device for selectively applying hydraulic fluid to first and second ends of the camshaft assembly in response to a driving condition of a vehicle, whereby the camshaft assembly reciprocates along the longitudinal axis; and a valve operation controller for variably controlling the operation of the valve while the camshaft reciprocates by hydraulic fluid from the hydraulic control device.

46 Claims, 4 Drawing Sheets

SYSTEM FOR VARIABLY CONTROLLING OPERATION OF AN INTAKE/EXHAUST VALVE FOR AN INTERNAL COMBUSTION ENGINE

BACKGROUND OF THE INVENTION

1. Field of the Invention

The present invention relates to an intake/exhaust valve control system for a combustion engine and, more particularly, to an intake/exhaust valve control system which can variably control the valve timing and valve lift over the whole engine running range.

2. Description of Related Art

Generally, the opening and closing of an intake/exhaust valve are controlled by a camshaft which is driven by a crankshaft connected to the camshaft by a chain or timing belt. Particularly, the design of the camshaft results in valves being opened and closed at a controlled rate of speed, as well as at a precise time in relation to the piston position.

Particularly, the design of the cam lobe contour has a major effect on engine performance. The amount of valve opening, how long the valve remains open (duration), when the valves open and close (valve timing), and the speed at which valves open and close are all determined by the cam lobe design.

The valve timing, valve duration and valve speed are fixed in accordance with the design of the cam lobe.

Therefore, it is impossible to vary the above three factors in response to the variation of driving condition of the vehicle.

That is, with the above fixed three factors, although a maximum output with a low fuel consumption ratio can be obtained at specific engine RPM ranges, but not at other engine RPM ranges.

Therefore, there is a need for a valve control system of an internal combustion engine that can variably control the valve timing and the valve opening duration (valve lift) in response to variation of a driving condition of the vehicle including engine RPM variation.

SUMMARY OF THE INVENTION

It is a first embodiment of the present invention to provide a valve control system for an internal combustion engine that can variably control the valve timing in response to the driving condition of the vehicle.

It is a second embodiment of the present invention to provide a valve control system for an internal combustion engine that can variably control the duration of valve opening in response to the driving condition of the vehicle.

It is a third embodiment of the present to provide a valve control system for an internal combustion engine that can variably control the duration of valve opening and the valve timing in response to the driving condition of the vehicle.

According to a feature of the present invention, a valve control system for variably controlling the operation of a valve for an internal combustion engine having a crankshaft, includes: a camshaft assembly having a cam for operating the valve while driven by a crankshaft; a hydraulic control device for selectively applying hydraulic fluid to first and second ends of the camshaft assembly in response to a driving condition of a vehicle, whereby the camshaft assembly reciprocates along the longitudinal axis; and valve operation control means for variably controlling the operation of the valve while the camshaft reciprocates by hydraulic fluid from the hydraulic control device.

To achieve the first object of the present invention, the valve operation control means comprises valve lift control means for variably controlling valve lift of the valve. The valve lift control means comprises a first housing for supporting the first end of the camshaft assembly such that the camshaft assembly can reciprocate along the longitudinal axis, said first housing rotatably driven by the crankshaft and transmitting rotating force to the first end of the camshaft such that the camshaft assembly rotates together with the first housing, and the first housing being supplied with hydraulic fluid acting on the first end of the camshaft assembly from the hydraulic control device in accordance with a driving condition of the vehicle; a second housing for supporting the second end of the camshaft assembly, said second housing being supplied with hydraulic fluid acting on the second end of the camshaft assembly in accordance with a driving condition of the vehicle; and a tapered portion formed on a portion of the cam which contacts the valve.

To achieve the second object of the present invention, the valve operation control means comprises valve timing control means for variably controlling valve timing. The timing control means comprising a first housing for being supplied with hydraulic fluid from the hydraulic control means and for supporting the first end of the camshaft assembly such that the camshaft assembly can reciprocate and spirally rotate along the longitudinal axis, said first housing rotatably driven by the crankshaft and transmitting rotating force to the first end of the camshaft such that the camshaft assembly rotates together with the first housing; and a second housing for supporting the second end of the camshaft assembly, said second housing being supplied with hydraulic fluid acting on the second end of the camshaft assembly in accordance with a driving condition of the vehicle.

The third embodiment of the present invention can be achieved by forming a tapered portion on the cam which contacts the valve.

In the first embodiment, the first end of the camshaft assembly is splined to the first housing.

In the second embodiment, the first end of the camshaft assembly is engaged with the first housing by helical gear meshing.

In addition, the second end of the camshaft assembly is splined to the second housing while the second housing is free to rotate.

Alternatively, the second end of the camshaft assembly may be free to rotate with respect to the second housing while the second housing is fixed.

The hydraulic control device comprises hydraulic fluid supply means for selectively supplying hydraulic fluid to the first and second housings; hydraulic fluid exhaust means for selectively exhausting hydraulic fluid directed to the first and second housings; and electronic control means for controlling the hydraulic fluid supply and exhaust means in response to a driving condition of vehicle.

The hydraulic fluid supply means comprises: a hydraulic source for generating hydraulic fluid; first and second pressure supply lines for supplying hydraulic fluid to the first and second housings, respectively; and first and second solenoid valves for selectively opening and closing the first and second pressure supply lines, respectively, said first and second solenoid valves being controlled by the electronic control means.

The first and second pressure supply lines are connected to a common line extending from the hydraulic source, the common line being provided with a filter for filtering aliens contained in the fluid, a first check valve for preventing fluid from being reversed, and an accumulator for enhancing hydraulic fluid supply to the first and second pressure supply lines.

The hydraulic fluid supply means further comprises a relief valve for constantly maintaining hydraulic fluid being directed to the common line.

The hydraulic fluid exhausting means comprises first and second hydraulic fluid exhaust lines for connecting the first and second housings to a fluid reserver, respectively, and third and fourth solenoid valves for selectively opening and closing the first and second hydraulic fluid exhaust lines, respectively, the third and fourth solenoid valves being controlled by the electronic control means.

The electronic control means comprises a signal input part for detecting the driving condition of the vehicle, and an electronic control unit ECU for receiving signals from the signal input part and controlling open and close operations of the hydraulic fluid supply and exhaust lines.

The signal input part comprises an RPM sensor for detecting engine RPM, a throttle valve position sensor for detecting throttle opening, a vehicle speed sensor, and a water temperature sensor for detecting a temperature of the engine cooling water.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Preferred embodiments of the present invention will now be described in detail with reference to the accompanying drawings.

Figure 1:
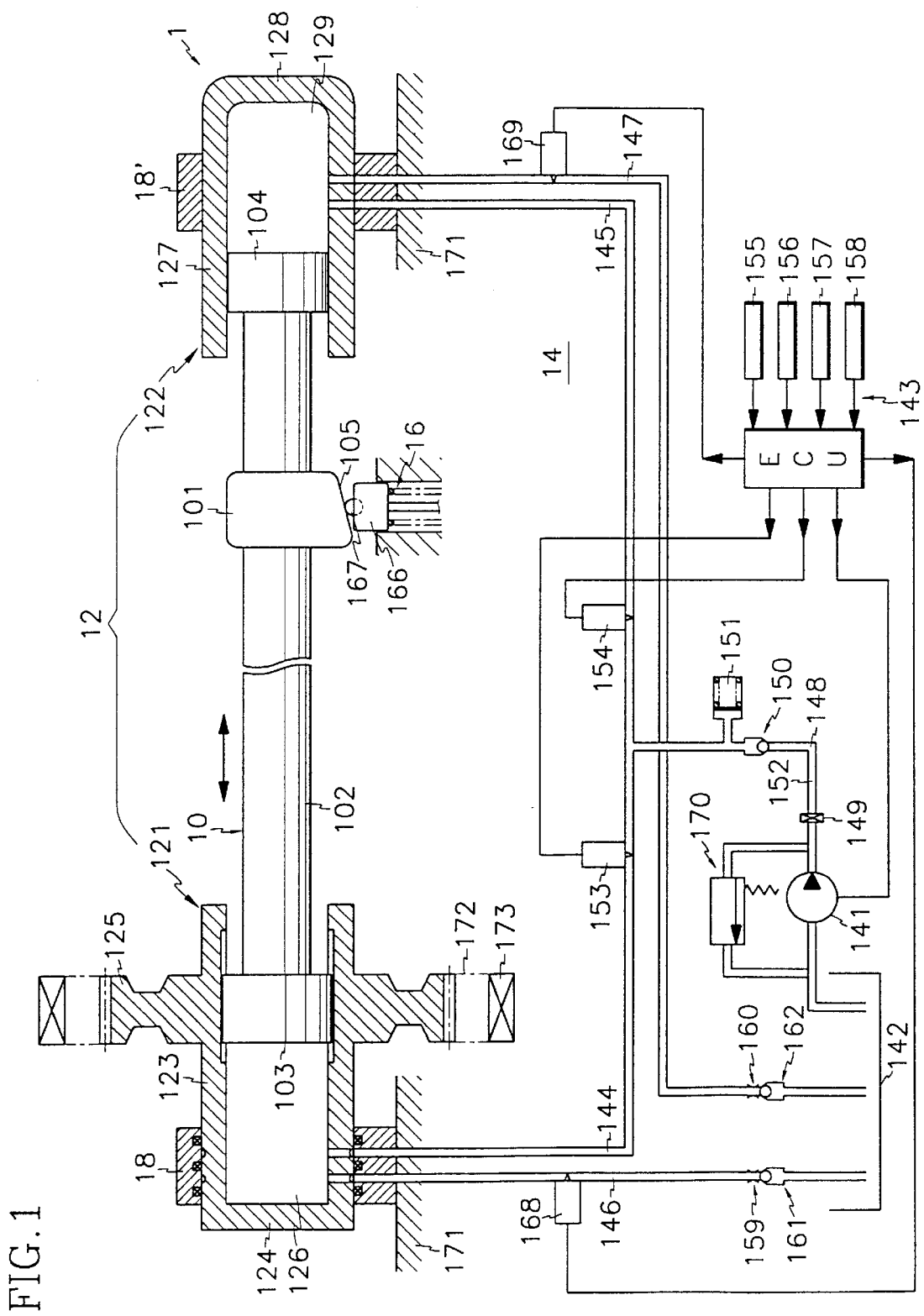
FIG. 1 is a schematic diagram of a valve control system for an internal combustion engine according to a first embodiment of the present invention.

Referring to FIG. 1, there is shown a schematic diagram of a valve control system for an internal combustion engine according to a first embodiment of the present invention.

As shown in FIG. 1, a valve control system 1 for an internal combustion engine comprises a camshaft assembly 10, a camshaft supporting assembly 12 for reciprocally supporting the camshaft assembly 10, and a hydraulic control part 14 for controlling the reciprocating motion of the camshaft assembly 10.

The camshaft assembly 10 includes a plurality of cams 101 (only one is shown in the drawing), a main shaft 102 around which the cam 101 is formed, and first and second pistons 103 and 104 formed on opposite ends of the main shaft 102, respectively. The cam 101 is tapered at 105 which contacts a valve 16 such that the valve lift of the valve 16 can be adjusted as the camshaft assembly 10 reciprocally moves along its longitudinal axis.

The camshaft supporting assembly 12 includes a first housing 121 for reciprocally but not rotatably supporting the first piston 103 of the camshaft assembly 10 and a second housing 122 for reciprocally and rotatably supporting the second piston 104. The first housing 121 includes a cylindrical side wall 123 and an end wall 124 closing one end of the cylindrical side wall 123. The other end of the cylindrical side wall 123 is opened so that the first piston 103 of the camshaft assembly 10 can be inserted therethrough. Therefore, the cylindrical side wall 123 and the end wall 124 define a first hydraulic chamber 126 with the first piston 103.

The first piston 103 of the camshaft assembly 10 is splined to an inner circumference of the cylindrical side wall 123 of the first housing 121 so that the piston 103 can not rotate relative to the housing but reciprocate in the longitudinal axis direction.

In addition, the first housing 121 is supported by a bracket 18 mounted on a cylinder head 171 and is provided at its outer circumference with a timing gear 125 integrally formed thereon. The timing gear 125 is connected to a crankshaft timing gear 173 through a connecting member 172 such as a chain or a belt. Therefore, as the first housing 121 is rotated by drive of the crankshaft timing gear 173, the first piston 103 splined to the cylindrical side wall 123 rotates together with the first housing 121, thereby rotating the camshaft assembly 10 to operate the valve 16 by the cam 101.

The second housing 122 includes a cylindrical side wall 127 and an end wall 128 closing one end of the cylindrical side wall 127. The other end of the cylindrical side wall 127 is opened so that the second piston 104 of the camshaft assembly 10 can be inserted therethrough.

Therefore, the cylindrical side wall 127 and the end wall 128 define a second hydraulic chamber 129 with the second piston 104.

In addition, the second housing 122 is also supported by a bracket 18' mounted on the cylinder head 171. The second piston 104 rotatably and reciprocally contacts an inner circumference of the cylindrical side wall 127 of the second housing 122 while forming a seal therebetween.

However, if the second housing 122 is rotatably supported by the bracket 18', the piston 104 may be also splined to the inner circumference of the cylindrical side wall 127 of the second housing 122.

In the above described structure of the camshaft assembly 10 and the camshaft supporting assembly 12, as the camshaft assembly 10 reciprocates in the longitudinal axis direction by hydraulic fluid directed into the first and second hydraulic chambers 126 and 129 in accordance with a driving condition of the vehicle, the valve lift is varied by the tapered portion 105 of the cam 101. The hydraulic fluid is controlled by the hydraulic control part 14 which will be described more in detail hereinafter.

As shown in FIG. 1, the hydraulic control part 14 comprises a fluid pump 141 which is a hydraulic source for generating hydraulic fluid, an electronic control part 143 for controlling hydraulic fluid directed from the fluid pump 141 to the first and second hydraulic chambers 126 and 129, and a fluid reservoir 142 to which hydraulic fluid directed to the first and second hydraulic chambers 126 and 129 is returned.

That is, the first and second hydraulic chambers 126 and 129 are supplied with hydraulic fluid from the fluid pump 141 through first and second pressure supply lines 144 and 145, respectively. Hydraulic fluid supplied to the first and second hydraulic chambers 126 and 129 is returned to the fluid reservoir 142 through first and second pressure exhaust lines 146 and 147, respectively. The first and second pressure supply lines 144 and 145 are connected to a common line 152 extending from the fluid pump 141.

Disposed on the common line 152 are a fluid filter 149 for filtering the fluid, a first check valve 150 for preventing the fluid from being reversed, and an accumulator 151 for enhancing the hydraulic fluid supply.

In addition, hydraulic fluid flowing along the first and second pressure supply lines 144 and 145 is controlled by first and second solenoid valves 153 and 154 disposed on the lines 144 and 145, respectively.

The first and second solenoid valves 153 and 154 are on/off controlled by the electronic control part 143. The electronic control part 143 comprises a signal input part for detecting the driving condition of the vehicle, and an electronic control unit ECU for receiving signals from the signal input part and controlling the operation of the solenoid valves 153 and 154 in accordance with the input signals.

The signal input part comprises an RPM sensor 155 for detecting engine RPM, a throttle valve position sensor 156 for detecting throttle opening, a vehicle speed sensor 157, and a water temperature sensor 158 for detecting a temperature of the cooling water.

In addition, the first and second pressure exhaust lines 146 and 147 are respectively provided with first and second orifices 159 and 156 to control the exhaust of hydraulic fluid. The first and second hydraulic exhaust lines 146 and 147 are respectively further provided with second and third check valves 161 and 162 to prevent fluid from being reversed from the reservoir 142 to the first and second hydraulic chambers 126 and 129.

The fluid pump 141 is provided with a relief valve 170 for preventing the pressure of the hydraulic fluid from increasing above a predetermined value.

The valve 16 includes a lash adjustor 166 on which a ball 167 is mounted to point-contact the tapered portion 105 of the cam 101.

In the valve control system 1 according to the first embodiment of the present invention, when the engine starts, hydraulic fluid generated from the fluid pump 141 is directed to the solenoid valves 153 and 154 which are controlled to line closing positions (for example, Off states).

In this state, the electronic control unit ECU controls the operation of the first and second solenoid valves 153 and 154 in response to signals transmitted from the sensors 155, 156, 157 and 158, thereby controlling the valve lift, that is, controlling the duration of the valve opening.

For example, when the first solenoid valve 153 is controlled to a line opening position (i.e., On state) by the electronic control unit ECU, hydraulic fluid is directed to the first hydraulic chamber 126 of the first housing 121 through the first pressure supply line 144. As a result, the camshaft assembly 10 is displaced toward the right in the drawing in accordance with an amount of the hydraulic fluid. At this point, since the cam 101 of the camshaft assembly 10 is tapered at 105, the valve lift of the valve 16 is varied.

In this state, with the change of a vehicle's driving condition, when the electronic control unit ECU controls the first solenoid valve 153 to the line closing position and the second solenoid valve 154 to the line opening position in accordance with signals transmitted from the sensors 155, 156, 157 and 158, the hydraulic fluid being directed to the first pressure chamber 126 is interrupted by the first solenoid valve 153 while hydraulic fluid is supplied to the second pressure chamber 129 through the second pressure supply line 145. With an increase in the amount of hydraulic fluid fed to the second pressure chamber 129, the camshaft assembly 10 is displaced toward the left in the drawing while exhausting hydraulic fluid fed to the first pressure chamber 126 to the reservoir 142 through the first pressure exhaust line 146.

At this point, as described above, since the cam 101 of the camshaft assembly 10 is tapered at 105, the valve lift of the valve 16 is varied, thereby adjusting the duration of the valve opening to be suitable to the driving condition of the vehicle.

On the other hand, the first and second pressure exhaust lines 146 and 147 are respectively provided with third and fourth solenoid valves 168 and 169, that are also controlled by the electronic control unit ECU of the electronic control part 143. The third and fourth solenoid valves 168 and 169 are designed to be controlled by the electronic control unit ECU to line closing positions when hydraulic fluid is supplied to the first and second pressure chambers 126 and 129 so as to prevent the supplied hydraulic fluid from being exhausted to the fluid reservoir 142 through the first and second pressure exhaust lines 146 and 147.

As described above, since the valve lift can be continuously adjusted in accordance with the driving condition of the vehicle, the fuel consumption ratio and engine output can be improved.

Figure 2:
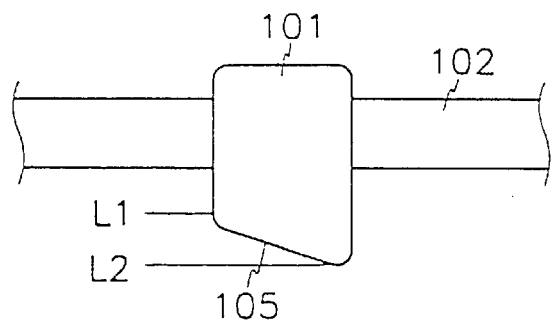
FIG. 2 is an enlarged view of the cam depicted in FIG. 1.

That is, as shown in FIG. 2, as the camshaft assembly 10 reciprocates along the longitudinal axis direction, by the tapered portion 105 of the cam 101, the valve lift is continuously varied between the minimum valve lift level L1 and the maximum valve lift level L2, thereby controlling the valve lift of the valve 16 in an optimal state conforming to the driving condition of the vehicle.

Figure 3:
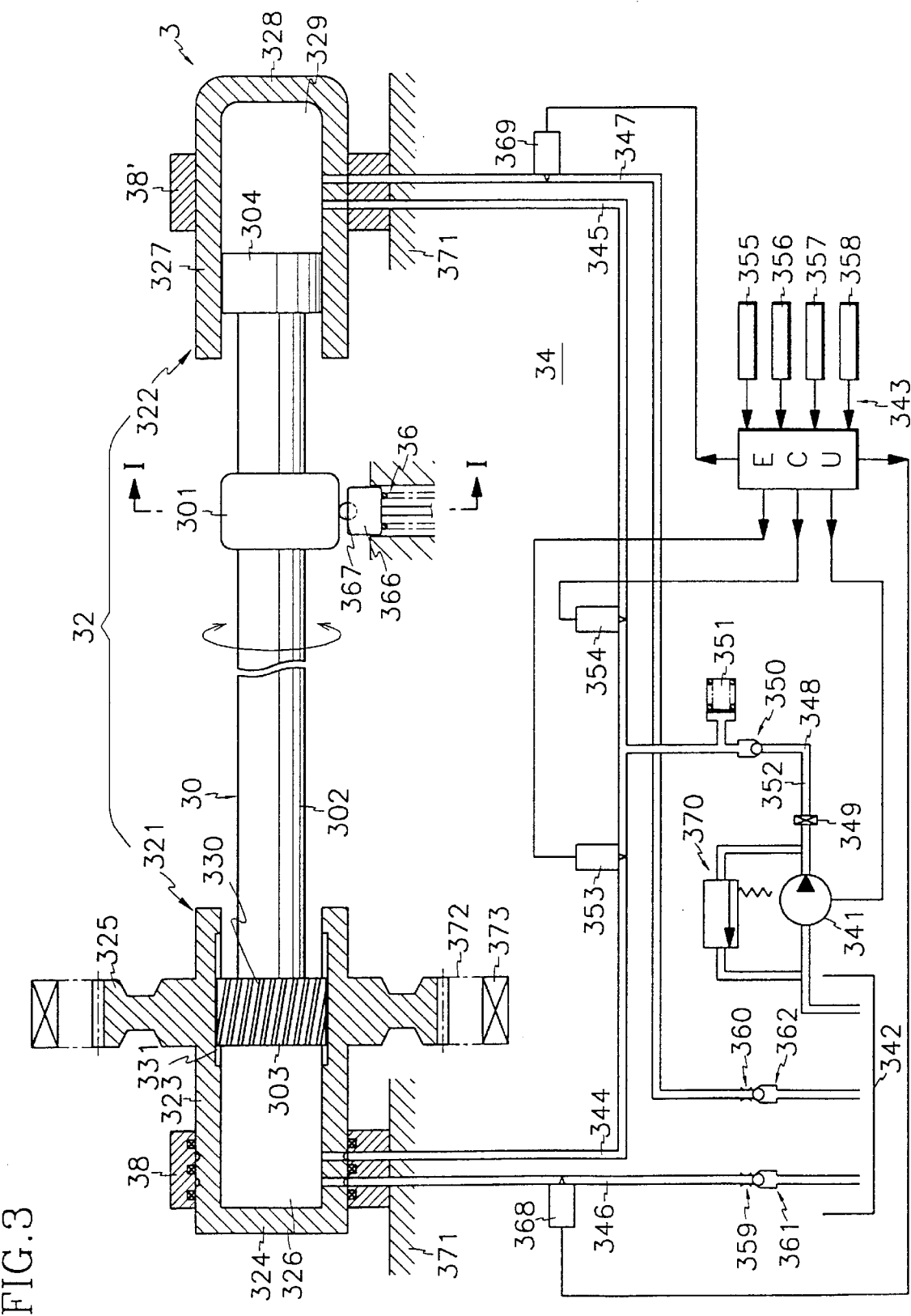
FIG. 3 is a schematic diagram of a valve control system for an internal combustion engine according to a second embodiment of the present invention.

Referring to FIG. 3, there is shown a schematic diagram of a valve control system for an internal combustion engine according to a second embodiment of the present invention.

As shown in FIG. 3, a valve control system 3 according to this embodiment comprises a camshaft assembly 30, a camshaft supporting assembly 32 for reciprocally supporting the camshaft assembly 30, and a hydraulic control part 34 for controlling the reciprocating motion of the camshaft assembly 30.

The camshaft assembly 30 includes a plurality of cams 301 (only one is shown in the drawing), a main shaft 302 around which the cam 301 is formed, and first and second pistons 303 and 304 formed on opposite ends of the main shaft 302, respectively.

The camshaft supporting assembly 32 includes a first housing 321 for reciprocally and rotatably supporting the first piston 303 of the camshaft assembly 30 and a second housing 322 for reciprocally and rotatably supporting the second piston 304. The first housing 321 includes a cylindrical side wall 323 and an end wall 324 closing one end of the cylindrical side wall 323. The other end of the cylindrical side wall 323 is opened so that the first piston 303 of the camshaft assembly 30 can be inserted therethrough. Therefore, the cylindrical side wall 323 and the end wall 324 define a first hydraulic chamber 326 with the first piston 303.

The first piston 303 is provided at its outer circumference with helical gear teeth 330, and the cylindrical side wall 323 of the first housing 321 is also provided at its inner circumference with helical gear teeth 331 meshing with the helical gear teeth 330. Therefore, the camshaft assembly 30 helically rotates relative to the first housing 321 while it reciprocates along the longitudinal axis thereof.

In addition, the first housing 321 is supported by a bracket 38 mounted on a cylinder head 371 and is provided at its outer circumference with a timing gear 325 integrally formed thereon. The timing gear 325 is connected to a crankshaft timing gear 373 by a connecting member 372 such as a chain or belt.

The second housing 322 includes a cylindrical side wall 327 and an end wall 328 closing one end of the cylindrical side wall 327. The other end of the cylindrical side wall 327 is opened so that the second piston 304 of the camshaft assembly 30 can be inserted therethrough.

Therefore, the cylindrical side wall 327 and the end wall 328 define a second hydraulic chamber 329 with the second piston 304.

In addition, the second housing 322 is also supported by a bracket 38' mounted on the cylinder head 371. The second piston 304 rotatably and reciprocally contacts an inner circumference of the cylindrical side wall 327 of the second housing 322 while forming a seal therebetween.

However, if the second housing 322 is rotatably supported by the bracket 38', the piston 304 may be splined to the inner circumference of the cylindrical side wall 327 of the second housing 322.

In the above described structure of the camshaft assembly 30 and the camshaft supporting assembly 32, the camshaft assembly 30 reciprocates by hydraulic fluid directed to the first and second hydraulic chambers 326 and 329 in accordance with the driving condition of the vehicle. At this point, since the helical gear teeth 330 formed around the first piston 303 mesh with the helical gear teeth 331 of the cylindrical side wall 323 of the first housing 321, the camshaft assembly 30 helically rotates while displacing in its longitudinal axis direction, thereby controlling valve timing. The hydraulic fluid directed to the first and second hydraulic chambers 326 and 329 is controlled by the hydraulic control part 34 which will be described more in detail hereinafter.

As shown in FIG. 3, the hydraulic control part 34 comprises a fluid pump 341 which is a hydraulic source for generating hydraulic fluid, an electronic control part 343 for controlling hydraulic fluid directed from the fluid pump 341 to the first and second hydraulic chambers 326 and 329, and a fluid reservoir 342 to which hydraulic fluid directed to the first and second hydraulic chambers 326 and 329 is returned.

That is, the first and second hydraulic chambers 326 and 329 are supplied with hydraulic fluid from the fluid pump 341 through first and second pressure supply lines 344 and 345, respectively. Hydraulic fluid supplied to the first and second hydraulic chambers 326 and 329 is returned to the fluid reservoir 342 through first and second pressure exhaust lines 346 and 347, respectively. The first and second pressure supply lines 344 and 345 are connected to a common line 352 extending from the fluid pump 341.

Disposed on the common line 352 are a fluid filter 349 for filtering the fluid, a first check valve 350 for preventing the fluid from being reversed, and an accumulator 351 for enhancing the hydraulic fluid supply.

In addition, hydraulic fluid flowing along the first and second pressure supply lines 344 and 345 is controlled by first and second solenoid valves 353 and 354 disposed on the lines 344 and 345, respectively.

The first and second solenoid valves 353 and 354 are on/off controlled by the electronic control part 343. The electronic control part 343 comprises a signal input part having an RPM sensor 355 for detecting engine RPM, a throttle valve position sensor 356 for detecting throttle opening, a vehicle speed sensor 357, and a water temperature sensor 358 for detecting a temperature of the cooling water, and an electronic control unit ECU for receiving signals from the sensors and controlling the operation of the solenoid valves 353 and 354.

In addition, the first and second pressure exhaust lines 346 and 347 are respectively provided with first and second orifices 359 and 360 to control exhaust hydraulic fluid. The first and second hydraulic exhaust lines 346 and 347 are respectively further provided with second and third check valves 361 and 362 to prevent fluid from being reversed from the reservoir 342 to the first and second hydraulic chambers 326 and 329.

The fluid pump 341 is provided with a relief valve 370 so as to prevent the pressure of the hydraulic fluid from increasing above a predetermined value.

In addition, the first and second pressure exhaust lines 346 and 347 are respectively provided with third and fourth solenoid valves 368 and 369, that are controlled by the electronic control unit ECU, for adjusting the exhaust of the hydraulic fluid.

The valve 36 includes a lash adjustor 366 on which a ball 367 is mounted to point-contact the cam 301.

In the valve control system 3 according to the second embodiment of the present invention, when the engine starts, hydraulic fluid generated from the fluid pump 341 is directed to the first and second solenoid valves 353 and 354 which are controlled to line closing positions (for example, Off states) by the electronic control unit ECU.

In this state, the electronic control unit ECU controls the operation of the first, second, third and fourth solenoid valves 353, 354, 368, and 369 in response to signals transmitted from the sensors 355, 356, 357 and 358, thereby controlling the valve timing.

For example, when the first solenoid valve 353 is controlled to a line opening position (i.e., On state) by the electronic control unit ECU, hydraulic fluid is directed to the first hydraulic chamber 326 of the first housing 321 through the first pressure supply line 344. As a result, the camshaft assembly 30 is displaced toward the right in the drawing in accordance with an amount of the hydraulic fluid. At this point, since the helical gear teeth 330 formed around the first piston 303 mesh with the helical gear teeth 331 of the cylindrical side wall 323 of the first housing 321, the camshaft assembly 30 helically rotates in proportion to the amount of the displacement of the camshaft assembly 30 toward the right by a predetermined helical angle, thereby controlling a valve timing.

Figure 4:
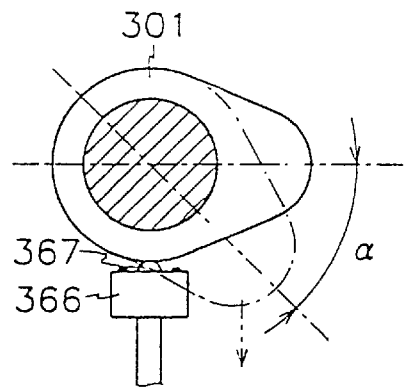
FIG. 4 is a sectional view taken along line I—I of FIG. 3.

More specifically with reference to FIG. 4, when the camshaft assembly 30 rotates relative to the first housing 321 by the helical meshing by an angle $\alpha$, the valve timing is varied by the angle phase difference.

In this state, with the change of a vehicle's driving condition, when the electronic control unit ECU controls the first solenoid valve 353 to the line closing position and the second solenoid valve 354 to the line opening position in accordance with signals transmitted from the sensors 355, 356, 357 and 358, the hydraulic fluid being directed to the first pressure chamber 326 is interrupted by the first solenoid valve 353 while hydraulic fluid is supplied to the second pressure chamber 329 through the second pressure supply line 345. With an increase in the amount of hydraulic fluid fed to the second pressure chamber 329, the camshaft assembly 30 is displaced toward the left in the drawing while exhausting hydraulic fluid fed to the first pressure chamber 326 to the reservoir 342 through the first pressure exhaust line 346.

At this point, as described above, since the helical gear teeth 330 formed around the first piston 303 mesh with the helical gear teeth 331 of the cylindrical side wall 323 of the first housing 321, the camshaft assembly 30 helically rotates relative to the first housing 321 in proportion to the amount of the displacement of the camshaft assembly 330 toward the left by a predetermined helical angle, thereby controlling a valve timing suitable to the changed driving condition of the vehicle.

On the other hand, the third and fourth solenoid valves 368 and 369 are designed to be controlled by the electronic control unit ECU to line closing positions when hydraulic fluid is supplied to the first and second pressure chambers 326 and 329 so as to prevent the supplied hydraulic fluid from being exhausted to the fluid reservoir 342 through the first and second pressure exhaust lines 346 and 347.

As described above, since the valve timing can be continuously varied in accordance with the driving condition of the vehicle, the fuel consumption ratio and engine output can be improved.

Figure 5:
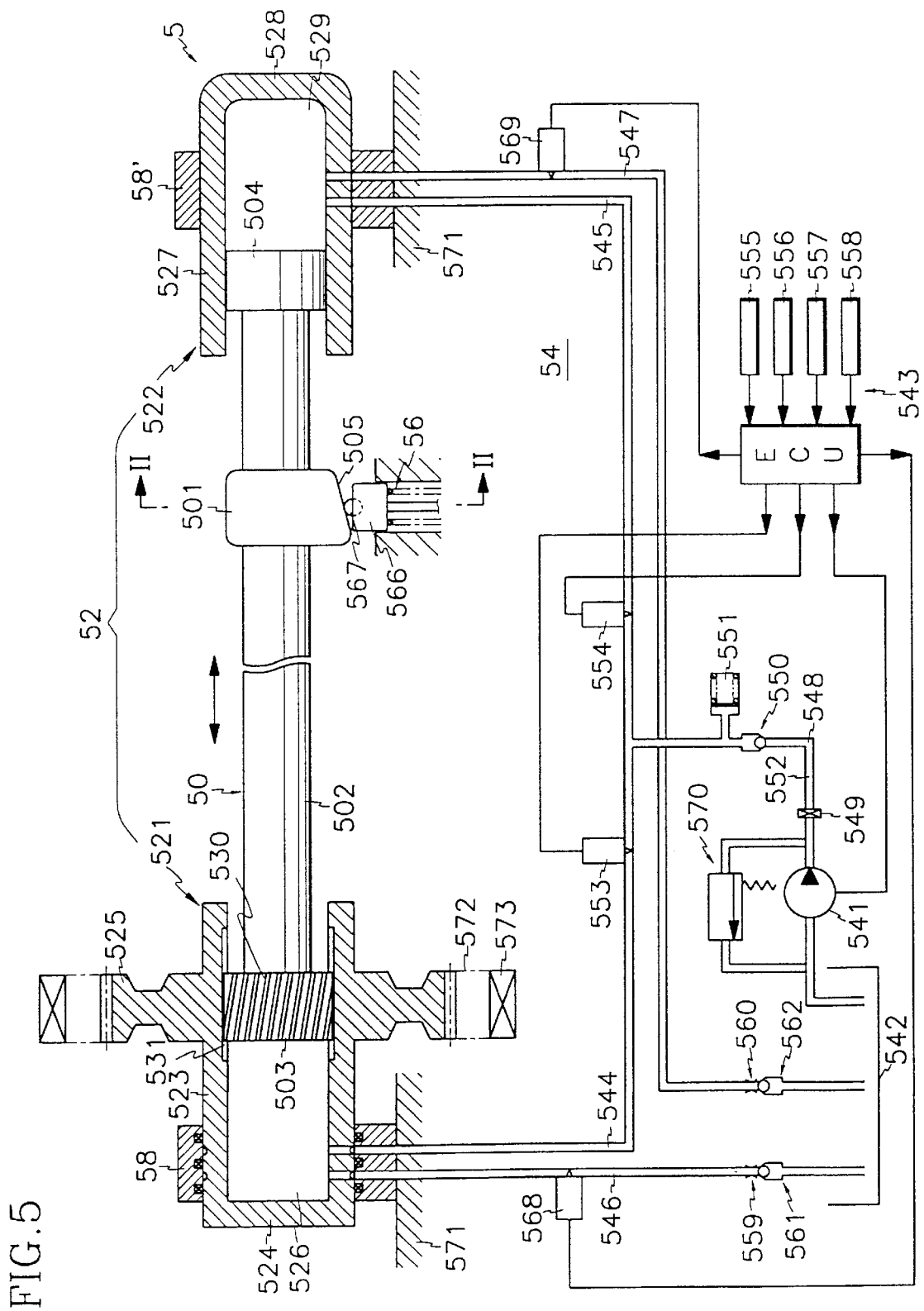
FIG. 5 is a schematic diagram of a valve control system for an internal combustion engine according to a third embodiment of the present invention.

Referring to FIG. 5, there is shown a schematic diagram of a valve control system for an internal combustion engine according to a third embodiment of the present invention.

As shown in FIG. 5, a valve control system 5 for an internal combustion engine comprises a camshaft assembly 50, a camshaft supporting assembly 52 for rotatably and reciprocally supporting the camshaft assembly 50, and a hydraulic control part 54 for controlling the reciprocating motion of the camshaft assembly 50.

The camshaft assembly 50 includes a plurality of cams 501 (only one is shown in the drawing), a main shaft 502 around which the cam 501 is formed, and first and second pistons 503 and 504 formed on opposite ends of the main shaft 502, respectively. The cam 501 is tapered at 505 which contacts a valve 56 such that the valve lift of the valve 56 can be adjusted as the camshaft assembly 50 reciprocally moves in its longitudinal axis direction.

The camshaft supporting assembly 52 includes a first housing 521 for reciprocally and rotatably supporting the first piston 503 of the camshaft assembly 50 and a second housing 522 for reciprocally and rotatably supporting the second piston 504. The first housing 521 includes a cylindrical side wall 523 and an end wall 524 closing one end of the cylindrical side wall 523. The other end of the cylindrical side wall 523 is opened so that the first piston 503 of the camshaft assembly 50 can be inserted therethrough. Therefore, the cylindrical side wall 523 and the end wall 524 define a first hydraulic chamber 526 with the first piston 503.

The first piston 503 is provided at its outer circumference with helical gear teeth 530, and the cylindrical side wall 523 of the first housing 521 is also provided at its inner circumference with helical gear teeth 531 meshing with the helical gear teeth 530. Therefore, the camshaft assembly 50 helically rotates while it reciprocates along the longitudinal axis direction.

The second housing 522 includes a cylindrical side wall 527 and an end wall 528 closing one end of the cylindrical side wall 527. The other end of the cylindrical side wall 527 is opened so that the second piston 504 of the camshaft assembly 50 can be inserted therethrough. Therefore, the cylindrical side wall 527 and the end wall 528 define a second hydraulic chamber 529 with the first piston 503.

In addition, the second housing 527 is also supported by a bracket 58' mounted on the cylinder head 571. The second piston 504 rotatably and reciprocally contacts an inner circumference of the cylindrical side wall 527 of the second housing 522 while forming a seal therebetween.

However, if the second housing 527 is rotatably supported by the bracket 58', the piston 504 may be splined to the inner circumference of the cylindrical side wall 527 of the second housing 522.

In the above described structure of the camshaft assembly 50 and the camshaft supporting assembly 52, as the camshaft assembly 50 reciprocates by hydraulic fluid directed into the first and second hydraulic chambers 526 and 529 in accordance with vehicle's driving condition, the valve lift is controlled by the tapered portion 505 of the cam 501. The hydraulic fluid is controlled by the hydraulic control part 54 which will be described hereinafter.

As shown in FIG. 5, the hydraulic control part 54 comprises a fluid pump 541 which is a hydraulic source for generating hydraulic fluid, an electronic control part 543 for controlling hydraulic fluid directed from the fluid pump 541 to the first and second hydraulic chambers 526 and 529, and a fluid reservoir 542 to which hydraulic fluid directed to the first and second hydraulic chambers 526 and 529 is returned.

That is, the first and second hydraulic chambers 526 and 529 are supplied with hydraulic fluid from the fluid pump 541 through first and second pressure supply lines 544 and 545, respectively. Hydraulic fluid supplied to the first and second hydraulic chambers 526 and 529 is returned to the fluid reservoir 542 through first and second pressure exhaust lines 546 and 547, respectively. The first and second pressure supply lines 544 and 545 are connected to a common line 552 extending from the fluid pump 541.

Disposed on the common line 552 are a fluid filter 549 for filtering the fluid, a first check valve 550 for preventing the fluid from being reverse, and an accumulator 551 for enhancing the hydraulic fluid supply.

In addition, hydraulic fluid flowing along the first and second pressure supply lines 544 and 545 is controlled by first and second solenoid valves 553 and 554 disposed on the lines 544 and 545, respectively.

The first and second solenoid valves 553 and 554 are on/off controlled by the electronic control part 543. The electronic control part 543 comprises a signal input part for detecting the driving condition of the vehicle, and an electronic control unit ECU for receiving signals from the signal input part and controlling the operation of the solenoid valves 553 and 554 in accordance with the received signal. The signal input part comprises an RPM sensor 555 for detecting engine RPM, a throttle valve position sensor 556 for detecting throttle opening, a vehicle speed sensor 557, and a water temperature sensor 558 for detecting a temperature of cooling water.

In addition, the first and second hydraulic exhaust lines 546 and 547 are respectively provided with first and second orifices 559 and 560 to control the exhaust of hydraulic fluid. The first and second hydraulic exhaust lines 546 and 547 are respectively further provided with second and third check valves 561 and 562 to prevent fluid from being reversed from the reservoir 542 to the first and second hydraulic chambers 526 and 529.

The fluid pump 541 is provided with a relief valve 570 for preventing the pressure of the hydraulic fluid from increasing above a predetermined value.

The valve 56 includes a lash adjustor 566 on which a ball 567 is mounted to point-contact the tapered portion 505 of the cam 501.

In the valve control system 5 according to the third embodiment of the present invention, when the engine starts, hydraulic fluid generated from the fluid pump 54 is directed to the solenoid valves 553 and 554 which are controlled to line closing positions (for example, Off states).

In this state, the electronic control unit ECU controls the operation of the first and second solenoid valves 553 and 554 in response to signals transmitted from the sensors 555, 556, 557 and 558, thereby controlling the valve timing and lift.

For example, when the first solenoid valve 553 is controlled to a line opening position (i.e., On state) by the electronic control unit ECU, hydraulic fluid is directed to the first hydraulic chamber 526 of the first housing 521 through the first pressure supply line 544. As a result, the camshaft assembly 50 is displaced toward the right in the drawing in accordance with an amount of the hydraulic fluid. At this point, since the cam 501 of the camshaft assembly 50 is tapered at 505, the valve lift is varied.

At the same time, since the helical gear teeth 530 formed around the first piston 503 mesh with the helical gear teeth 531 of the cylindrical side wall 523 of the first housing 521, the camshaft assembly 50 helically rotates in proportion to the amount of the displacement of the camshaft assembly 50 toward the right by a predetermined helical angle, thereby varying the valve timing.

In this state, with the change of a vehicle's driving condition, when the electronic control unit controls the first solenoid valve 553 to the line closing position and the second solenoid valve 554 to the line opening position in accordance with signals transmitted from the sensors 555, 556, 557 and 558, the hydraulic fluid being directed to the first pressure chamber 526 is interrupted by the first solenoid valve 553 while hydraulic fluid is supplied to the second pressure chamber 529 through the second pressure supply line 545. With an increase in the amount of hydraulic fluid fed to the second pressure chamber 529, the camshaft assembly 50 is displaced toward the left in the drawing while exhausting hydraulic fluid fed to the first pressure chamber 526 to the reservoir 542 through the first pressure exhaust line 546.

At this point, as described above, since the cam 501 of the camshaft assembly 50 is tapered at 505, the valve lift of the valve 56 is varied, thereby adjusting the duration of the valve opening to conform to the varied driving condition of the vehicle.

At the same time, as described above, since the helical gear teeth 530 formed around the first piston 503 mesh with the helical gear teeth 531 of the cylindrical side wall 523 of the first housing 521, the camshaft assembly 50 helically rotates in proportional to the amount of the displacement of the camshaft assembly 50 toward the left by a predetermined helical angle, thereby controlling a valve timing to conform to the varied driving condition of the vehicle.

Figure 6:
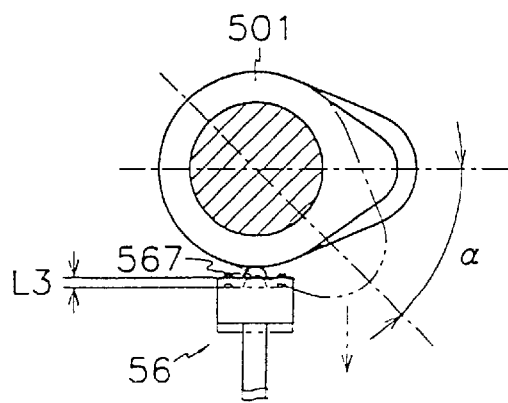
FIG. 6 is a sectional view taken along line II—II of FIG. 5.

That is, as shown in FIG. 6, while the camshaft assembly 50 is displaced in the right in the drawing, the camshaft assembly 50 varies its valve timing by being rotated relative to the housing 521 by an angle α, and corresponding phase difference, that varies the valve lift by a distance L3.

On the other hand, the first and second pressure exhaust lines 546 and 547 are respectively provided with third and fourth solenoid valves 568 and 569, that are also controlled by the electronic control unit ECU of the electronic control part 543. The first and second solenoid valves 568 and 569 are designed to be controlled by the electronic control unit ECU to line closing positions when hydraulic fluid is supplied to the first and second pressure chambers 526 and 529 so as to prevent the supplied hydraulic fluid from being exhausted to the fluid reservoir 542 through the first and second pressure exhaust lines 546 and 547.

As described above, since the valve lift can be adjusted in accordance with the driving condition of the vehicle, the fuel consumption ratio and engine output can be improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A valve control system for variably controlling operation of a valve for an internal combustion engine having a crankshaft, comprising:

a camshaft assembly having a cam for operating the valve while driven by the crankshaft, said camshaft having a longitudinal axis;

a hydraulic control device for selectively applying hydraulic fluid to first and second ends of the camshaft assembly in response to a driving condition of a vehicle, whereby the camshaft assembly reciprocates along the longitudinal axis; and valve operation control means for variably controlling the operation of the valve while the camshaft reciprocates by hydraulic fluid from the hydraulic control device.

2. The valve control system of claim 1, wherein the valve operation control means comprises valve lift control means for variably controlling valve lift of the valve, said valve lift control means comprising:

a first housing for supporting the first end of the camshaft assembly such that the camshaft assembly can reciprocate along the longitudinal axis, said first housing being rotatably driven by the crankshaft and transmitting rotating force to the first end of the camshaft such that the camshaft assembly rotates together with the first housing, and the first housing being supplied with hydraulic fluid acting on the first end of the camshaft assembly from the hydraulic control device in accordance with the driving condition of the vehicle;

a second housing for supporting the second end of the camshaft assembly, said second housing being supplied with hydraulic fluid acting on the second end of the camshaft assembly in accordance with the driving condition of the vehicle; and a tapered portion formed on a portion of the cam which contacts the valve.

3. The valve control system of claim 2, wherein the first end of the camshaft assembly is splined to the first housing.

4. The valve control system of claim 1, wherein the valve operation control means comprises valve timing control means for variably controlling valve timing, said valve timing control means comprising:

a first housing for being supplied with hydraulic fluid from the hydraulic control device and for supporting the first end of the camshaft assembly such that the camshaft assembly can reciprocate and spirally rotate along the longitudinal axis, said first housing being rotatably driven by the crankshaft and transmitting rotating force to the first end of the camshaft such that the camshaft assembly rotates together with the first housing; and a second housing for supporting the second end of the camshaft assembly, said second housing being supplied with hydraulic fluid acting on the second end of the camshaft assembly in accordance with the driving condition of the vehicle.

5. The valve control system of claim 2, wherein the second end of the camshaft assembly is free to rotate with respect the second housing while the second housing is fixed.

6. The valve control system of claim 2, wherein the hydraulic control device comprises:
hydraulic fluid supply means for selectively supplying hydraulic fluid to the first and second housings;
hydraulic fluid exhaust means for selectively exhausting hydraulic fluid directed to the first and second housings; and
electronic control means for controlling the hydraulic fluid supply and exhaust means in response to the driving condition of the vehicle.

7. The valve control system of claim 6, wherein the hydraulic fuild supply means comprises:
a hydraulic source for generating hydraulic fluid;
first and second pressure supply lines for supplying hydraulic fluid to the first and second housings, respectively; and
first and second solenoid valves for selectively opening and closing the first and second pressure supply lines, respectively, said first and second solenoid valves being controlled by the electronic control means.

8. The valve control system of claim 7, wherein the first and second pressure supply lines are connected to a common line extending from the hydraulic source, the common line being provided with a filter for filtering the fluid, a first check valve for preventing fluid from being reversed, and an accumulator for enchancing the pressure supplied to the first and second pressure supply lines.

9. The valve control system of claim 8, wherein the hydraulic fluid supply means further comprises a relief valve for constantly maintaining a hydraulic fluid flow in the common line.

10. The valve control system of claim 6, wherein the hydraulic fluid exhausting means comprises first and second hydraulic fluid exhaust lines for connecting the first and second housings to a fluid reservoir, respectively, and third and fourth solenoid valves for selectively opening and closing the first and second hydraulic fluid exhaust lines, respectively, the third and fourth solenoid valves being controlled by the electronic control means.

11. The valve control system of claim 6, wherein the electronic control means comprises a signal input part for detecting the driving condition of the vehicle, and an electronic control unit (ECU) for receiving signals from the signal input part and controlling open and close operations of the hydraulic fluid supply and exhaust lines.

12. The valve control system of claim 11, wherein the signal input part comprises an RPM sensor for detecting engine RPM, a throttle valve position sensor for detecting throttle opening, a vehicle speed sensor, and a water temperature sensor for detecting a temperature of the engine cooling water.

13. The valve control system of claim 4, wherein a tapered portion is formed on a portion of the cam which contacts the valve such that valve lift can be variably controlled when the camshaft assembly reciprocates along the longitudinal axis.

14. The valve control system of claim 4, wherein the first end of the camshaft assembly is engaged with the first housing by helical gear meshing.

15. The valve control system of claim 4, wherein the second end of the camshaft assembly is free to rotate with respect the second housing while the second housing is fixed.

16. The valve control system of claim 4, wherein the hydraulic control device comprises:
hydraulic fluid supply means for selectively supplying hydraulic fluid to the first and second housings;
hydraulic fluid exhaust means for exhausting hydraulic fluid directed to the first and second housings; and
electronic control means for controlling the hydraulic fluid supply and exhaust means in response to the driving condition of the vehicle.

17. The valve control system of claim 16, wherein the hydraulic fluid supply means comprises:
a hydraulic source for providing hydraulic fluid;
first and second pressure supply lines for supplying hydraulic fluid to the first and second housings, respectively; and
first and second solenoid valves for selectively opening and closing the first and second pressure supply lines, respectively, said first and second solenoid valves being controlled by the electronic control means.

18. The valve control system of claim 17, wherein the first and second pressure supply lines are connected to a common line extending from the hydraulic source, the common line being provided with a filter for filtering the fluid, a first check valve for preventing fluid from being reversed, and an accumulator for temporally storing fluid and supplying the fluid to the first and second pressure supply lines with increased pressure.

19. The valve control system of claim 17, wherein the hydraulic fluid supply means further comprises a relief valve for constantly maintaining a hydraulic fluid flow in the common line.

20. The valve control system of claim 16, wherein the hydraulic fluid exhausting means comprises first and second hydraulic fluid exhaust lines for connecting the first and second housings to a fluid reservoir, respectively, and third and fourth solenoid valves for selectively opening and closing the first and second hydraulic fluid exhaust lines, respectively, the third and fourth solenoid valves being controlled by the electronic control means.

21. The valve control system of claim 16, wherein the electronic control means comprises a signal input part for detecting the driving condition of the vehicle, and an electronic control unit (ECU) for receiving signals from the signal input part and controlling open and close operations of the hydraulic fluid supply and exhaust lines.

22. The valve control system of claim 21, wherein the signal input part comprises an RPM sensor for detecting engine RPM, a throttle valve position sensor for detecting throttle opening, a vehicle speed sensor, and a water temperature sensor for detecting a temperature of the engine cooling water.

23. A valve control system for variably controlling operation of a valve for an internal combustion engine having a crankshaft, comprising:
a camshaft assembly having a cam, disposed on a cylinder head of the engine, said camshaft assembly having a longitudinal axis;
camshaft assembly rotating means for rotating the camshaft assembly and operating the valve by the cam; and
valve lift control means for variably controlling valve lift of the valve by reciprocationg the camshaft assembly along the longitudial axis in accordance with a driving condition of a vehicle, said valve lift control means including a hydraulic control device for selectively applying hydraulic fluid to first and second ends of the camshaft assembly in response to a driving condition of a vehicle, whereby the camshaft assembly reciprocates along the longitudinal axis.

24. The valve control system of claim 23, wherein the camshaft assembly rotating means comprises a crankshaft sprocket.

25. The valve control system of claim 23, wherein the valve lift control means further comprises:

a first housing for supporting the first end of the camshaft assembly such that the camshaft assembly can reciprocate along the longitudinal axis, said first housing rotatably driven by the crankshaft and transmitting a rotating force to the first end of the camshaft such that the camshaft assembly rotates together with the first housing, and the first housing being supplied with hydraulic fluid acting on the first end of the camshaft assembly from the hydraulic control device in accordance with the driving condition of the vehicle;

a second housing for supporting the second end of the camshaft assembly, said second housing being supplied with hydraulic fluid acting on the second end of the camshaft assembly in accordance with the driving condition of the vehicle; and a tapered portion formed on a portion of the cam which contacts the valve.

26. The valve control system of claim 25, wherein the first end of the camshaft assembly is splined to the first housing.

27. The valve control system of claim 25, wherein the second end of the camshaft assembly is free to rotate with respect the second housing while the second housing is fixed.

28. The valve control system of claim 25, wherein the hydraulic control device comprises:

hydraulic fluid supply means for selectively supplying hydraulic fluid to the first and second housings;

hydraulic fluid exhaust means for exhausting hydraulic fluid directed to the first and second housings; and electronic control means for controlling the hydraulic fluid supply and exhaust means in response to the driving condition of the vehicle.

29. The valve control system of claim 28, wherein the hydraulic fluid supply means comprises:

a hydraulic source for providing hydraulic fluid;

first and second pressure supply lines for supplying hydraulic fluid to the first and second housings, respectively; and first and second solenoid valves for selectively opening and closing the first and second pressure supply lines, respectively, said first and second solenoid valves being controlled by the electronic control means.

30. The valve control system of claim 29, wherein the first and second pressure supply lines are connected to a common line extending from the hydraulic source, the common line being provided with a filter for filtering the fluid, a first check valve for preventing fluid from being reversed, and an accumulator for temporally storing fluid and supplying the fluid to the first and second pressure supply lines with increased pressure.

31. The valve control system of claim 30, wherein the hydraulic fluid supply means further comprises a relief valve for constantly maintaining a hydraulic fluid flow in the common line.

32. The valve control system of claim 28, wherein the hydraulic fluid exhausting means comprises first and second hydraulic fluid exhaust lines for connecting the first and second housings to a fluid reservoir, respectively, and third and fourth solenoid valves for selectively opening and closing the first and second hydraulic fluid exhaust lines, respectively, the third and fourth solenoid valves being controlled by the electronic control means.

33. The valve control system of claim 28, wherein the electronic control means comprises a signal input part for detecting the driving condition of the vehicle, and an electronic control unit (ECU) for receiving signals from the signal input part and controlling open and close operations of the hydraulic fluid supply and exhaust lines.

34. The valve control system of claim 33, wherein the signal input part comprises an RPM sensor for detecting engine RPM, a throttle valve position sensor for detecting throttle opening, a vehicle speed sensor, and a water temperature sensor for detecting a temperature of the engine cooling water.

35. A valve control system for variably controlling operation of a valve for an internal combustion engine having a crankshaft, comprising:

a camshaft assembly having a cam, disposed on a cylinder head of the engine, said camshaft assembly having a longitudinal axis;

a camshaft assembly rotating means for rotating the camshaft assembly and operating the valve by the cam; and valve lift control means for variably controlling valve lift and timing by further rotating the camshaft assembly, independent of the rotation of the camshaft assembly by the camshaft assembly rotating means, to cause the camshaft assembly to reciprocate along the longitudinal axis in accordance with a driving condition of a vehicle, said valve lift control means including a hydraulic control device for selectively applying hydraulic fluid to first and second ends of the camshaft assembly in response to the driving condition of the vehicle, whereby the camshaft assembly reciprocates along the longitudinal axis.

36. The valve control system of claim 35, wherein the valve lift control means further comprising:

a first housing for receiving hydraulic fluid from the hydraulic control means and for supporting the first end of the camshaft assembly such that the camshaft assembly can reciprocate and rotate along the longitudinal axis, said first housing being rotatably driven by the crankshaft and transmitting rotation force to the first end of the camshaft such that the camshaft assembly rotates together with the first housing; and a second housing for receiving hydraulic fluid from the hydraulic control means and for supporting the second end of the camshaft assembly, said second housing being supplies with hydraulic fluid acting on the second end of the camshaft assembly in accordance with the driving condition of the vehicle.

37. The valve control system of claim 36, wherein a tapered portion is formed on a portion of the cam which contacts the valve such that valve lift can be variably controlled when the camshaft assembly reciprocates along the longitudinal axis.

38. The valve control system of claim 36, wherein the first end of the camshaft assembly is engaged with the first housing by helical gear meshing.

39. The valve control system of claim 36, wherein the second end of the camshaft assembly is free to rotate with respect the second housing while the second housing is fixed.

40. The valve control system of claim 39, wherein the hydraulic control device comprises:

hydraulic fluid supply means for selectively supplying hydraulic fluid to the first and second housings;

hydraulic fluid exhaust means for exhausting hydraulic fluid directed to the first and second housings; and electronic control means for controlling the hydralic fluid supply and exhaust means in response to the driving condition of the vehicle.

41. The valve control system of claim 39, wherein the hydraulic fluid supply means comprises:

a hydraulic source for providing hydraulic fluid;

first and second pressure supply lines for supplying hydraulic fluid to the first and second housings, respectively; and first and second solenoid valves for selectively opening and closing the first and second pressure supply lines, respectively, said first and second solenoid valves being controlled by the electronic control means.

42. The valve control system of claim 41, wherein the first and second pressure supply lines are connected to a common line extending from the hydraulic source, the common line being provided with a filter for filtering the fluid, a first check valve for preventing fluid from being reversed, and an accumulator for temporally storing fluid and supplying the fluid to the first and second pressure supply lines with increased pressure.

43. The valve control system of claim 42, wherein the hydraulic fluid supply means further comprises a relief valve for constantly maintaining a hydraulic fluid flow in the common line.

44. The valve control system of claim 40, wherein the hydraulic fluid exhausting means comprises first and second hydraulic fluid exhaust lines for connecting the first and second housings to a fluid reservoir, respectively, and third and fourth solenoid valves for selectively opening and closing the first and second hydraulic fluid exhaust lines, respectively, the third and fourth solenoid valves being controlled by the electronic control means.

45. The valve control system of claim 40, wherein the electronic control means comprises a signal input part for detecting the driving condition of the vehicle, and an electronic control unit (ECU) for receiving signals from the signal input part and controlling open and close operations of the hydraulic fluid supply and exhaust lines.

46. The valve control system of claim 45, wherein the signal input part comprises an RPM sensor for detecting engine RPM, a throttle valve position sensor for detecting throttle opening, a vehicle speed sensor, and a water temperature sensor for detecting a temperature of the engine cooling water.

* * * * *